No. 779,091. Patented January 3, 1905.

UNITED STATES PATENT OFFICE.

WALTER MILLS, OF LONDON, ENGLAND, ASSIGNOR TO A. O. GRANGER, OF CARTERSVILLE, GEORGIA.

PROCESS OF MAKING SILICOFLUORID OF LEAD.

SPECIFICATION forming part of Letters Patent No. 779,091, dated January 3, 1905.

Application filed May 25, 1903. Serial No. 158,622.

*To all whom it may concern:*

Be it known that I, WALTER MILLS, a subject of the King of Great Britain, residing in London, England, have invented certain new and useful Improvements in Manufactures of Silicofluorid of Lead, of which the following is a specification.

The present process of making silicofluorid of lead ($PbSiF_6$) is especially suited for the manufacture of such compound on a large or commercial scale and is based upon the discovery that lead not only in its metallic condition, but as it exists in its ores (especially galena and cerusite) is readily attacked and dissolved by hydrofluosilicic acid, particularly when that acid is sufficiently concentrated and when the concentrated acid is heated.

In carrying out the present process I prefer to use the crushed and finely-ground ore. The acid and the ore are permitted to react in a pan or other receptacle, and the reaction is assisted by the aid of heat, which is usually continued until the mass has reached a substantially dry condition. If galena is used, it is immaterial whether it be added to the acid or the acid added to it. If ore such as cerusite or other oxygen-carrying compound be used, it is necessary to add the ore to the acid—that is, to have the acid in excess—as otherwise silicates are formed. In practice I find that the warm acid begins to attack and dissolve the substance when the former is of a specific gravity of about 1.80°.

In the subjection of scrap lead to the action of the acid experience has demonstrated that the reaction is somewhat accelerated by blowing air through the mass.

Ordinarily water somewhat warm is added to the material after the reaction has ceased in order to obtain an aqueous solution of lead silicofluorid. This solution may be filtered and is then ready for use.

Having described my invention, I claim—

1. The process of manufacturing silicofluorid of lead which consists in subjecting galena and cerusite to the action of hydrofluosilicic acid and blowing air through the mixture during the reaction.

2. The process of manufacturing silicofluorid of lead which consists in heating a mixture of galena and hydrofluosilicic acid and blowing air through the mixture during the reaction.

3. The process of manufacturing silicofluorid of lead which consists in heating a mixture of a lead-carrying substance and hydrofluosilicic acid having a specific gravity of about 1.80°, and blowing air through the mixture during the reaction.

4. The process of manufacturing silicofluorid of lead which consists in heating a mixture of galena and hydrofluosilicic acid, blowing air through the mixture during the reaction, and adding water to the resultant silicofluorid to form a solution thereof.

Signed at Nos. 9 to 15 Murray street, New York, N. Y., this 23d day of May, 1903.

WALTER MILLS.

Witnesses:
FRED. J. DOLE,
JOHN O. SEIFERT.